(12) United States Patent
Jung et al.

(10) Patent No.: US 11,616,921 B2
(45) Date of Patent: Mar. 28, 2023

(54) IMAGE SENSOR AND OPERATING METHOD THEREOF

(71) Applicant: SAMSUNG ELECTRONICS CO., LTD., Suwon-si (KR)

(72) Inventors: Jaejin Jung, Hwaseong-si (KR); Sinhwan Lim, Hwaseong-si (KR); Kwisung Yoo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/665,943

(22) Filed: Feb. 7, 2022

(65) Prior Publication Data

US 2022/0286635 A1 Sep. 8, 2022

(30) Foreign Application Priority Data

Mar. 4, 2021 (KR) .................. 10-2021-0029083

(51) Int. Cl.
*H04N 5/347* (2011.01)
*H04N 5/374* (2011.01)
*H04N 9/04* (2006.01)
*H04N 5/378* (2011.01)

(52) U.S. Cl.
CPC ............ *H04N 5/347* (2013.01); *H04N 5/374* (2013.01); *H04N 5/378* (2013.01); *H04N 9/04555* (2018.08)

(58) Field of Classification Search
CPC ........ H04N 5/343; H04N 5/347; H04N 5/374; H04N 5/378; H04N 9/04555; H04N 9/0451
See application file for complete search history.

(56) References Cited

U.S. PATENT DOCUMENTS

| 7,990,447 | B2 * | 8/2011 | Honda | H04N 9/735 |
| | | | | 382/167 |
| 9,001,233 | B2 * | 4/2015 | Kasai | H04N 5/35554 |
| | | | | 348/308 |
| 9,699,429 | B2 | 7/2017 | Kaizu | |
| 10,200,664 | B2 | 2/2019 | Kaizu | |
| 10,389,956 | B2 | 8/2019 | Kim et al. | |

(Continued)

FOREIGN PATENT DOCUMENTS

KR    10-1632991 B1    6/2016
KR    10-2020-0108953 A    9/2020

*Primary Examiner* — Lin Ye
*Assistant Examiner* — Chriss S Yoder, III
(74) *Attorney, Agent, or Firm* — Lee IP Law, P.C.

(57) ABSTRACT

An image sensor includes: a pixel array including a plurality of pixels divided into a plurality of binning areas; a readout circuit configured to, from the plurality of binning areas, receive a plurality of pixel signals including a first sensing signal of first pixels and a second sensing signal of second pixels during a single frame period and output a first pixel value corresponding to the first pixels and a second pixel value corresponding to the second pixels based on the plurality of pixel signals; and an image signal processor configured to generate first image data based on a plurality of first pixel values corresponding to the plurality of binning areas, generate second image data based on a plurality of second pixel values corresponding to the plurality of binning areas, and generate output image data by merging the first image data with the second image data.

20 Claims, 14 Drawing Sheets

(56) References Cited

U.S. PATENT DOCUMENTS

| | | | |
|---|---|---|---|
| 11,089,242 B2 * | 8/2021 | Min | H04N 5/347 |
| 2008/0260291 A1 * | 10/2008 | Alakarhu | H04N 9/04557 |
| | | | 348/E9.01 |
| 2020/0295096 A1 | 9/2020 | Min et al. | |

* cited by examiner

IMAGE SENSOR AND OPERATING METHOD THEREOF

CROSS-REFERENCE TO RELATED APPLICATION

This application is based on and claims priority under 35 U.S.C. § 119 to Korean Patent Application No. 10-2021-0029083, filed on Mar. 4, 2021, in the Korean Intellectual Property Office, the disclosure of which is incorporated by reference herein in its entirety.

BACKGROUND

1. Field

Embodiments relate to an image sensor and an operating method thereof.

2. Description of the Related Art

An image sensor is a device capturing a two-dimensional or three-dimensional image of an object. An image sensor generates an image of an object by using a photoelectric conversion device that reacts according to an intensity of light reflected by the object. The recent development of complementary metal-oxide semiconductor (CMOS) technology has allowed for wide use of a CMOS image sensor using CMOS technology. As the demand for high-definition and high-quality photographs and images has increased, a size of image data generated by an image sensor is increasing.

SUMMARY

An embodiment is directed to an image sensor including: a pixel array including a plurality of pixels divided into a plurality of binning areas, the plurality of pixels including red pixels, blue pixels, first green pixels, second green pixels, and pixels selected from white or yellow pixels; a readout circuit configured to, from each of the plurality of binning areas, receive a plurality of pixel signals including a first sensing signal of first pixels and a second sensing signal of second pixels during a single frame period, and output a first pixel value corresponding to the first pixels and a second pixel value corresponding to the second pixels based on the plurality of pixel signals; and an image signal processor configured to generate first image data based on a plurality of first pixel values corresponding to the plurality of binning areas, generate second image data based on a plurality of second pixel values corresponding to the plurality of binning areas, and generate output image data by merging the first image data with the second image data. The first pixels may include the red pixels, the blue pixels, the first green pixels, or the second green pixels, and the second pixels may include the white or yellow pixels.

An embodiment is directed to an image sensor including: a pixel array in which a plurality of pixel groups are arranged, each of the pixel groups including color pixels and white pixels sharing a floating diffusion node; a readout circuit configured to receive, from each of the plurality of pixel groups, during a single frame period, a reset signal, a first image signal including a sensing signal of the color pixels, and a second image signal including sensing signals of the color pixels and the white pixels and output color pixel values corresponding to the color pixels and white pixel values corresponding to the white pixels based on the received reset signal, first image signal, and second image signal; and an image signal processor configured to generate output image data based on a plurality of color pixel values and a plurality of white pixel values corresponding to the plurality of pixel groups.

An embodiment is directed to an operating method of an image sensor, the operating method including: reading out, from each of a plurality of binning areas of a pixel array, a plurality of pixel signals including a sensing signal of color pixels and a sensing signal of white pixels in a single frame period; generating first image data including color pixel values based on the plurality of pixel signals; generating second image data including white pixel values based on the plurality of pixel signals; and generating output image data by merging the first image data with the second image data.

BRIEF DESCRIPTION OF THE DRAWINGS

Features will become apparent to those of skill in the art by describing in detail example embodiments with reference to the attached drawings in which.

DETAILED DESCRIPTION

Figure 1:
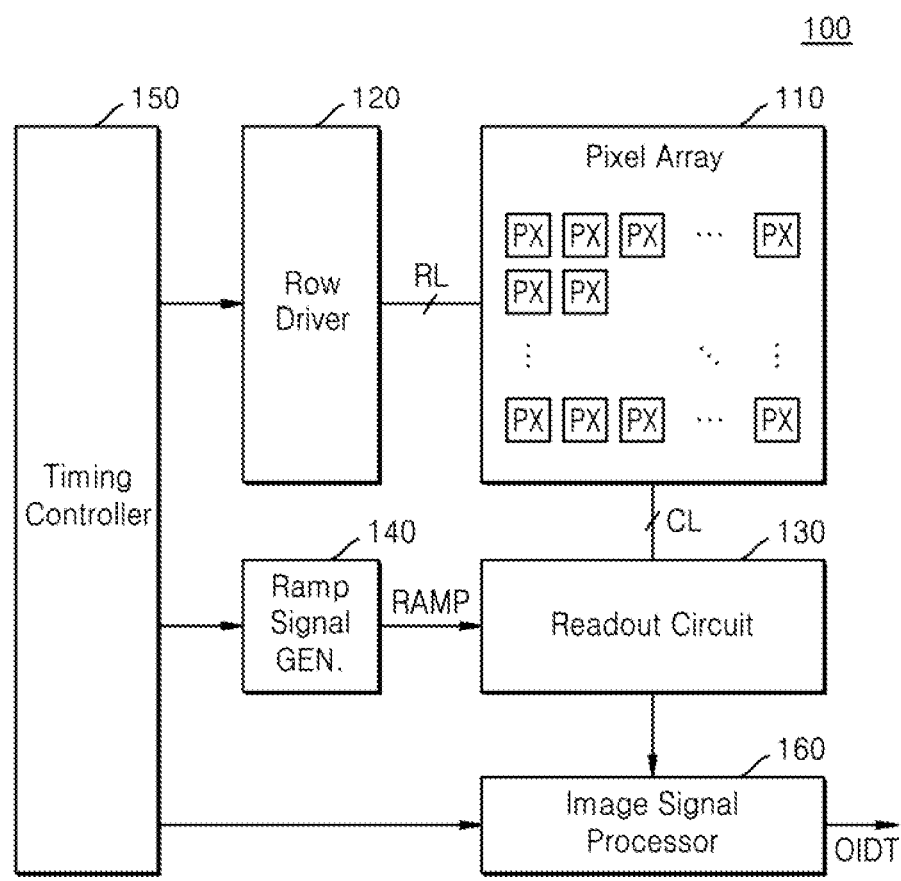
FIG. 1 is a block diagram illustrating an image sensor according to an example embodiment.
Figure 2:
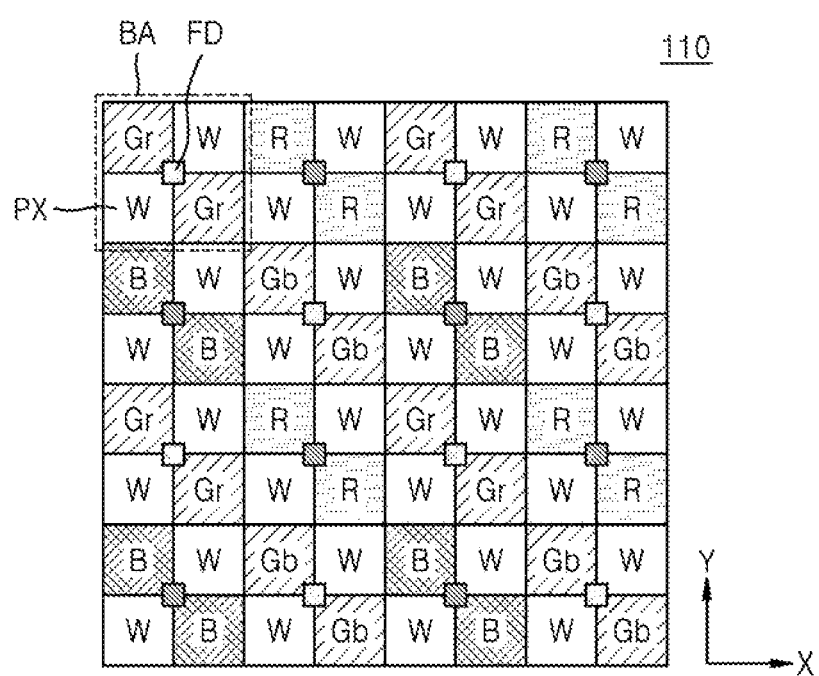
FIG. 2 is a diagram illustrating an example of a pattern of a pixel array of FIG. 1.

FIG. 1 is a block diagram illustrating an image sensor according to an example embodiment. FIG. 2 is a diagram illustrating an example of a pattern of a pixel array of FIG. 1.

An image sensor 100 may be mounted in an electronic device having an imaging or a light sensing function. For example, the image sensor 100 may be mounted in an electronic device such as a camera, a smartphone, a wearable device, an Internet of Things (IoT) device, a household appliance, a tablet personal computer (PC), a personal digital assistant (PDA), a portable multimedia player (PMP), a navigation device, a drone, an Advanced Drivers Assistance System (ADAS), or the like. The image sensor 100 may be included in an electronic device included as a component of a vehicle, furniture, manufacturing equipment, a door, a measuring instrument, or the like.

Referring to FIG. 1, the image sensor 100 may include a pixel array 110, a row driver 120, a readout circuit 130, a ramp signal generator 140, a timing controller 150, and an image signal processor 160.

The pixel array 110 may include a plurality of pixels PX arranged in a matrix, and a plurality of row lines RL and a plurality of column lines CL connected to the plurality of pixels PX. Each of the plurality of pixels PX may include at least one photoelectric conversion device (which may be referred to as an optical sensing device), and the photoelectric conversion device may sense light and convert the sensed light into photocharges. The photoelectric conversion device may include, e.g., an optical sensing device including an organic material or an inorganic material, such as an inorganic photodiode, an organic photodiode, a perovskite photodiode, a photo-transistor, a photo-gate, or a pinned photodiode. According to an example embodiment, each of the plurality of pixels PX may include a plurality of photoelectric conversion devices.

The plurality of pixels PX may each sense light of a certain spectral range from received light. For example, the pixel array 110 may include a red pixel converting light of a red spectral range into an electrical signal, a green pixel converting light of a green spectral range into an electrical signal, and a blue pixel converting light of a blue spectral range into an electrical signal. The pixel array 110 may also include pixels converting light of other spectral ranges into an electrical signal, such as a white pixel or a yellow pixel, instead of or in addition to any of the red, green, or blue pixels.

The pixel array 110 illustrated in FIG. 2 as an example may be applied as the pixel array 110 of FIG. 1. According to an example embodiment, the pixel array 110 may have an RGBW pattern.

Referring to FIG. 2, the RGBW pattern may include a first row and a second row in which a green pixel (e.g., a first green pixel Gr), a white pixel W, a red pixel R, and a white pixel W are sequentially arranged, and a third row and a fourth row in which a blue pixel B, a white pixel W, a green pixel (e.g., a second green pixel Gb), and a white pixel W are sequentially arranged, and the first through fourth rows may be repeatedly arranged. In the RGBW pattern, white pixels W in the first through fourth rows may be arranged in diagonal directions with respect to each other. In other implementations, color pixels and white pixels may be arranged in various manners in the pixel array 110 having an RGBW pattern, e.g., white pixels W may be located at positions of the color pixels Gr, Gb, R, and B of the pixel array 110 disclosed in FIG. 2, and color pixels may be located at positions of the white pixels W.

Hereinafter, the pixel array 110 having an RGBW pattern will be described as an example. However, the pixel array 110 may also have, e.g., an RGBY pattern, in which yellow pixels Y are arranged instead of white pixels W.

Referring to FIG. 2, the pixel array 110 may be divided into a plurality of binning areas BA. Each of the plurality of binning areas BA may include a plurality of pixels PX arranged in a (2n)×(2n) matrix (n is a positive integer). The plurality of pixels PX included in each of the plurality of binning areas BA may share a floating diffusion node FD and output pixel signals via one column line CL. The plurality of pixels PX sharing the floating diffusion node FD may also be referred to as a pixel group.

For example, referring to FIG. 2, each of the plurality of binning areas BA may include four pixels PX that are arranged in a 2×2 matrix and share the floating diffusion node FD. According to an example embodiment, the plurality of binning areas BA may be arranged in parallel to each other in a first direction (e.g., an X-axis direction) and a second direction (e.g., a Y-axis direction) in the pixel array 110.

In the present example embodiment, the plurality of binning areas BA are each a basic unit to which a read-out method (described in further detail below) is applied when the image sensor 100 operates in a first mode of performing binning, and may respectively correspond to a plurality of binning areas of image data generated based on read-out pixel signals. According to a read-out method of an example embodiment, a plurality of pixel signals may be simultaneously read out in units of at least two rows from each of the plurality of binning areas BA. For example, a plurality of pixel signals of a plurality of pixels PX corresponding to at least two rows in one frame period may be read out. A read-out method according to an example embodiment will be described below with reference to FIGS. 3 and 4.

When the image sensor 100 operates in a second mode, e.g., in a normal mode in which binning is not performed, a plurality of pixel signals may be sequentially read out from the pixel array 110 in units of rows.

Referring further to FIG. 1, the row driver 120 may generate a plurality of control signals for controlling operation of the pixels PX arranged in each row according to the control by the timing controller 150. The row driver 120 may provide a plurality of control signals to the plurality of pixels PX of the pixel array 110, respectively, via the plurality of row lines RL. In response to the plurality of control signals provided by the row driver 120, the pixel array 110 may be driven in units of at least one row according to an operating mode. The pixel array 110 may output a plurality of pixel signals via the plurality of column lines CL according to the control by the row driver 120.

The readout circuit 130 may include an analog-to-digital converter (ADC) circuit and a line buffer. The ADC circuit may receive a plurality of pixel signals read out from a plurality of pixels PX of a row selected by the row driver 120 from among the plurality of pixels PX, and convert the plurality of pixel signals into a plurality of pixel values, which are digital data.

The ADC circuit may convert the plurality of pixel signals received from the pixel array 110 via the plurality of column lines CL, into digital data based on a ramp signal RAMP from the ramp signal generator 140 to generate and output pixel values in units of at least one row.

The readout circuit 130 may include a plurality of ADC circuits respectively corresponding to the plurality of column lines CL, and each ADC circuit may compare a pixel signal received via each column line CL corresponding to each ADC circuit, to a ramp signal RAMP, and generate a pixel value based on results of comparing. For example, an ADC circuit may remove a reset signal from a sensing signal by using a correlated double sampling (CDS) method, and generate a pixel value indicating an amount of light received by a pixel PX. According to an operating mode of the image sensor 100, a pixel value may indicate an amount of light sensed by a pixel PX or an amount of light sensed by pixels PX in a binning area BA.

A line buffer may include a plurality of line memories, and may store a plurality of pixel values output from an ADC circuit in units of certain rows. Thus, the line buffer may store pixel values output from the ADC circuit in units of certain rows. For example, the line buffer may store a plurality of pixel values corresponding to one row or a plurality of pixel values corresponding to two rows according to an operating mode of the image sensor 100.

According to an example embodiment, the readout circuit 130 may receive a plurality of pixel signals from pixels PX included in each binning area BA in a first mode of performing binning, and output color pixel values and white pixel values based on the received plurality of pixel signals. For example, an ADC circuit of the readout circuit 130 may receive, from pixels PX included in one binning area BA, a reset signal, a first image signal corresponding to a sensing signal of white pixels W, and a second image signal corresponding to a sensing signal of color pixels (e.g., a red pixel R, a blue pixel B, a first green pixel Gr, or a second green pixel Gb) and white pixels W. The ADC circuit may output a color pixel value and a white pixel value based on the reset signal, the first image signal, and the second image signal. Thus, the readout circuit 130 may output a color pixel value corresponding to two color pixels included in one binning area BA and output one white pixel value corresponding to two white pixels included in the one binning area BA.

As described above, a method of outputting one color pixel value and one white pixel value from the binning area BA including two color pixels and two white pixels may be referred to as a 2-sum method. The read-out method according to an example embodiment will be described below with reference to FIGS. 3 and 4.

The readout circuit 130 may receive a plurality of pixel signals from pixels PX in units of rows in a second mode in which binning is not performed, and output pixel values in units of rows based on the received plurality of pixel signals.

The ramp signal generator 140 may generate the ramp signal RAMP increasing or decreasing at a certain slope, and provide the ramp signal RAMP to the readout circuit 130.

The timing controller 150 may control timing of other components of the image sensor 100, e.g., timing of the row driver 120, the readout circuit 130, the ramp signal generator 140, and the image signal processor 160.

The image signal processor 160 may receive pixel values from the readout circuit 130, arrange the received pixel values to generate image data, and perform image processing operations such as image quality compensation, binning, downsizing, or the like, on the generated image data. Accordingly, image-processed output image data OIDT may be generated and output.

In an example embodiment, in the first mode, the image signal processor 160 may generate first image data based on the color pixel values stored in the line buffer and generate second image data based on the white pixel values stored in the line buffer. In addition, the image signal processor 160 may generate the output image data OIDT by merging the first image data with the second image data. The image signal processor 160 may process the first image data and the second image data in units of the binning areas BA. For example, the image signal processor 160 may generate output image data OIDT having a reduced data size by merging a color pixel value corresponding to a first binning area among the first image data with a white pixel value corresponding to a first binning area among the second image data.

In the second mode, the image signal processor 160 may generate original image data based on a plurality of pixel values corresponding to a plurality of rows stored in the line buffer, process the generated original image data, and output the output image data OIDT, of which a data size is maintained.

In an example embodiment, the image signal processor 160 may process the first image data, the second image data, and the original image data for each color. For example, the image signal processor 160 may process each of red, green, and blue pixels in parallel or in series. In an example embodiment, the image signal processor 160 may include a plurality of processing circuits to perform processing for each color in parallel as described above. In another implementation, one processing circuit may be repeatedly reused.

The output image data OIDT may be output to an external processor, e.g., an application processor, and the application processor may store the output image data OIDT, perform image processing on the output image data OIDT, or display the output image data OIDT.

Figure 3:
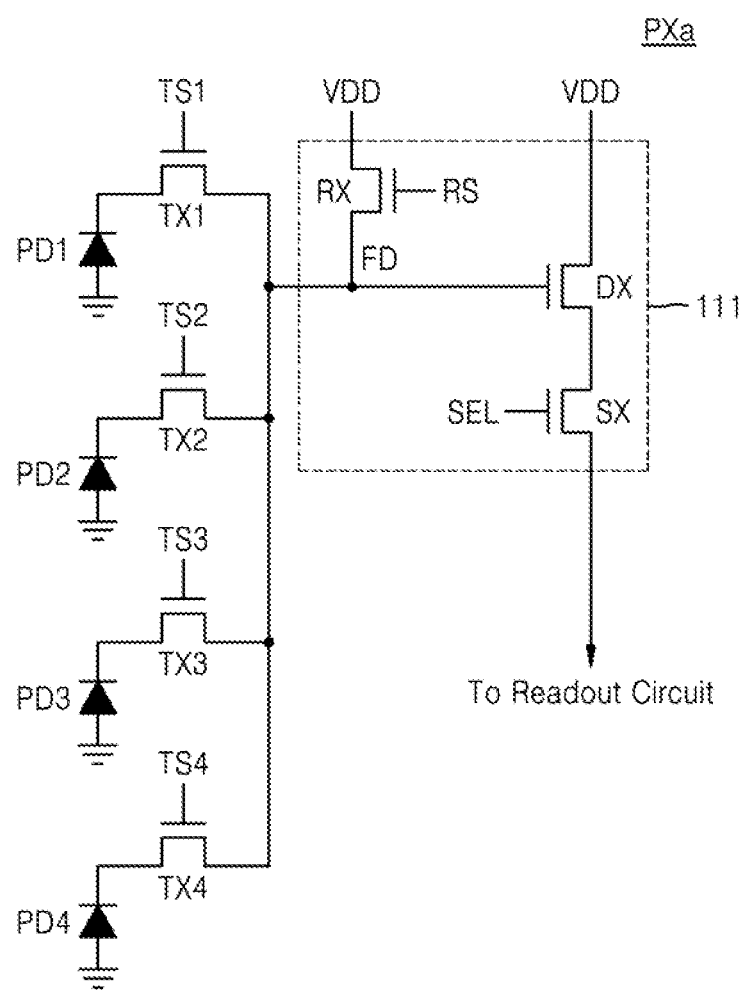
FIG. 3 is a circuit diagram illustrating a structure of a pixel of a pixel array according to an example embodiment.

FIG. 3 is a circuit diagram illustrating a structure of a pixel of a pixel array according to an example embodiment.

Referring to FIG. 3, a pixel PXa may include a plurality of photoelectric conversion devices PD1, PD2, PD3, and PD4 and a pixel circuit 111. Each of the plurality of photoelectric conversion devices PD1, PD2, PD3, and PD4 may be implemented using a photodiode, and a micro-lens may be arranged on each of the plurality of photoelectric conversion devices PD1, PD2, PD3, and PD4. Thus, a combination of a micro-lens with a photoelectric conversion device may be referred to as one pixel, and the pixel PXa of FIG. 3 may be considered as four pixels, accordingly.

The pixel circuit 111 may include a reset transistor RX, a driving transistor DX, and a selection transistor SX. First through fourth transmission transistors TX1, TX2, TX3, and TX4 may be respectively connected to the photoelectric conversion devices PD1, PD2, PD3, and PD4. Control signals, including a reset control signal RS, a selection control signal SEL, and transmission control signals TS including a first transmission control signal TS1, a second transmission control signal TS2, a third transmission control signal TS3, and a fourth transmission control signal TS4, may be applied to the pixel circuit 111. At least some of the control signals may be generated by the row driver 120.

The floating diffusion node FD may be shared among the four photoelectric conversion devices PD1, PD2, PD3, and PD4 and the first through fourth transmission transistors TX1, TX2, TX3, and TX4. The first through fourth transmission transistors TX1, TX2, TX3, and TX4 may respectively connect the plurality of photoelectric conversion devices PD1, PD2, PD3, and PD4 to the floating diffusion node FD or block them therefrom in response to the first through fourth transmission control signals TS1, TS2, TS3, and TS4, respectively.

The reset transistor RX may reset charges accumulated in the floating diffusion node FD. A driving voltage VDD may be applied to a first terminal of the reset transistor RX, and a second terminal of the reset transistor RX may be connected to the floating diffusion node FD. The reset transistor RX may be turned on or off in response to the reset control signal RS received from the row driver 120, and the charges accumulated in the floating diffusion node FD may be discharged to reset the floating diffusion node FD.

Light incident on the plurality of photoelectric conversion devices PD1, PD2, PD3, and PD4 may be accumulated as charges through photoelectric conversion. When the charges accumulated in the plurality of photoelectric conversion devices PD1, PD2, PD3, and PD4 are transferred to the floating diffusion node FD, the charges may be output to the outside as pixel signals using the driving transistor DX and the selection transistor SX. A pixel signal corresponding to a variation in a voltage of the floating diffusion node FD may be transmitted to the readout circuit 130 of the outside.

The pixel PXa may be applied to the pixel array 110 of FIG. 2. For example, the four photoelectric conversion devices PD1, PD2, PD3, and PD4 of the pixel PXa may respectively correspond to four pixels arranged 2×2 in the binning area BA. Thus, the four pixels arranged 2×2 in the binning area BA in FIG. 2 may respectively share the floating diffusion node FD like the pixel PXa of FIG. 3. When the first through fourth transmission transistors TX1, TX2, TX3, and TX4 are turned on or off simultaneously, the pixels arranged 2×2 may operate as one large pixel as illustrated in FIG. 2.

In an example embodiment, two photoelectric conversion devices among the plurality of photoelectric conversion devices PD1, PD2, PD3, and PD4, e.g., PD1 and PD3, may correspond to color pixels, and the other two photoelectric conversion devices, e.g., PD2 and PD4, may correspond to white pixels W. For example, referring to FIG. 2, the two photoelectric conversion devices PD1 and PD3 may correspond to the first green pixel Gr, and the other two photoelectric conversion devices PD2 and PD4 may correspond to the white pixel W. In another implementation, color pixels corresponding to photoelectric conversion devices may be the red pixel R, the blue pixel B, or the second green pixel Gb.

Figure 4:
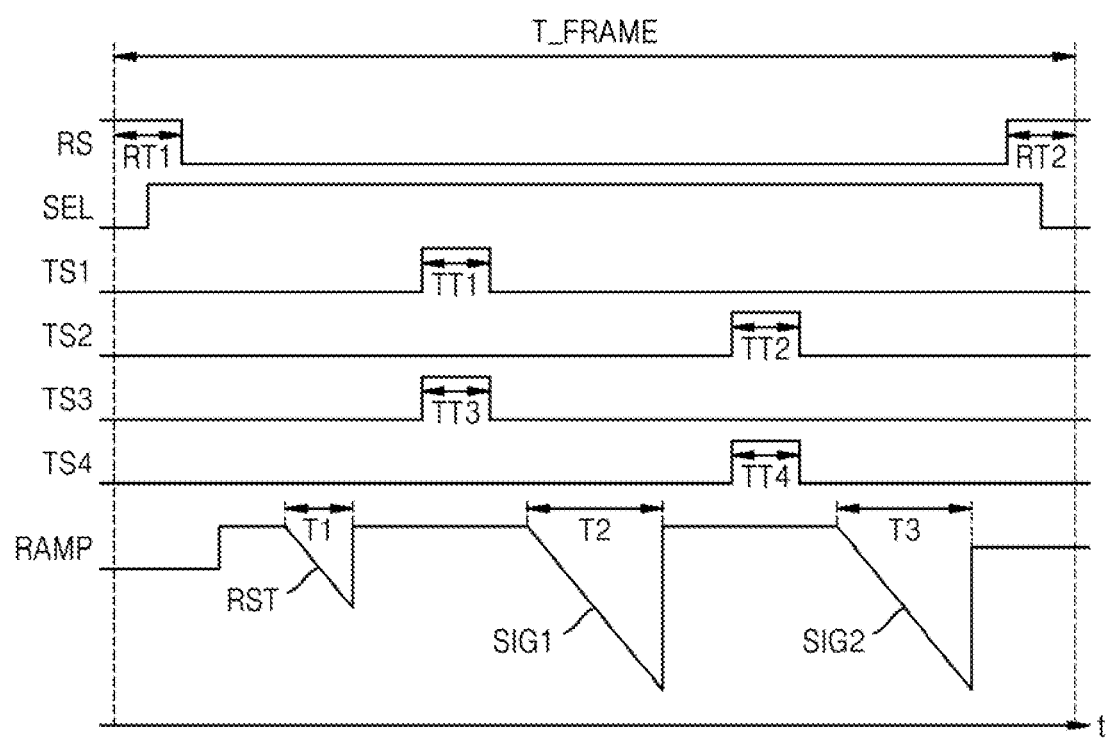
FIG. 4 is a timing diagram illustrating control signals and a ramp signal provided to a pixel, according to an example embodiment.

FIG. 4 is a timing diagram illustrating control signals and a ramp signal provided to a pixel, according to an example embodiment. FIG. 4 will be described on the basis of the pixel PXa of FIG. 3.

Referring to FIGS. 3 and 4, operations described below may be performed in a frame period T_FRAME. In the frame period T_FRAME, the selection control signal SEL may be shifted from a second level (e.g., logic low) to a first level (e.g., logic high) and maintained at the first level.

The reset control signal RS may be shifted from a low level to a high level and maintain the high level for a first reset time period RT1. In the present example embodiment, the reset transistor RX is turned on according to the reset control signal RS of a high level, and thus the floating diffusion node FD may be reset (reset operation). For example, a voltage of the floating diffusion node FD may be reset to the driving voltage VDD.

When the reset operation is ended, as the reset control signal RS is shifted from a high level to a low level, a reset signal RST corresponding to charges according to the reset operation, accumulated in the floating diffusion node FD, may be output for a first time period T1 via a column line CL. The ramp signal RAMP may be generated to decrease (or increase) at a certain slope for the first time period T1. During the first time period T1 in which a voltage level of the ramp signal RAMP is varied constantly, the readout circuit 130 may compare the ramp signal RAMP to the reset signal RST.

After the first time period T1 has passed, the first transmission control signal TS1 may be shifted from a low level to a high level to maintain the high level for a first transmission time period TT1, and the third transmission control signal TS3 may be shifted from the low level to the high level to maintain the high level for a third transmission time period TT3. In an example embodiment, the first transmission time period TT1 may overlap at least partially with the third transmission time period TT3.

In the present example embodiment, the first transmission transistor TX1 is turned on by the first transmission control signal TS1 of a high level, and thus photocharges generated by a first photoelectric conversion device PD1 may be accumulated in the floating diffusion node FD (accumulation operation). In the present example embodiment, the third transmission transistor TX3 is turned on by the third transmission control signal TS3 of a high level, and thus photocharges generated by a third photoelectric conversion device PD3 may be accumulated in the floating diffusion node FD (accumulation operation). For example, a voltage of the floating diffusion node FD may decrease from the driving voltage VDD according to an amount of accumulated charges.

In the present example embodiment, referring to FIG. 3, the first photoelectric conversion device PD1 and the third photoelectric conversion device PD3 correspond to color pixels, and thus charges corresponding to color pixel values may be additionally accumulated in the floating diffusion node FD via the above-described accumulation operations. Thus, a charge corresponding to a reset operation and a charge corresponding to a color pixel value may be accumulated in the floating diffusion node FD.

When the accumulation operation is completed as the first transmission control signal TS1 and the third transmission control signal TS3 are shifted from the high level to the low level, a first image signal SIG1 corresponding to the charges accumulated in the floating diffusion node FD according to the accumulation operation may be output for a second time period T2 via the column line CL. The ramp signal RAMP may be generated to decrease (or increase) at a certain slope for the second time period T2. During the second time period T2 in which a voltage level of the ramp signal RAMP is varied constantly, the readout circuit 130 may compare the ramp signal RAMP to the first image signal SIG1.

After the second time period T2 has passed, the second transmission control signal TS2 may be shifted from the low level to the high level to maintain the high level for a second transmission time period TT2, and the fourth transmission control signal TS4 may be shifted from the low level to the high level to maintain the high level for a fourth transmission time period TT4. In an example embodiment, the second transmission time period TT2 may overlap at least partially with the fourth transmission time period TT4.

In the present example embodiment, the second transmission transistor TX2 is turned on by the second transmission control signal TS2 of a high level, and thus photocharges generated by the second photoelectric conversion device PD2 may be accumulated in the floating diffusion node FD (accumulation operation). In the present example embodiment, the fourth transmission transistor TX4 is turned on by the fourth transmission control signal TS4 of a high level, and thus photocharges generated by the fourth photoelectric conversion device PD4 may be accumulated in the floating diffusion node FD (accumulation operation).

In the present example embodiment, referring to FIG. 3, the second photoelectric conversion device PD2 and the fourth photoelectric conversion device PD4 correspond to white pixels, and thus charges corresponding to white pixel values may be additionally accumulated in the floating diffusion node FD via the above-described accumulation operations. Thus, a charge corresponding to a reset operation, a charge corresponding to a color pixel value, and a charge corresponding to a white pixel value may be accumulated in the floating diffusion node FD.

When the accumulation operation is ended as the second transmission control signal TS2 and the fourth transmission control signal TS4 are shifted from the high level to the low level, a second image signal SIG2 corresponding to charges accumulated in the floating diffusion node FD according to the accumulation operation may be output for a third time period T3 via the column line CL. The ramp signal RAMP may be generated to decrease (or increase) at a certain slope for the third time period T3. During the third time period T3 in which a voltage level of the ramp signal RAMP is varied constantly, the readout circuit 130 may compare the ramp signal RAMP to the second image signal SIG2.

After the third time period T3 has passed, the reset control signal RS may be shifted from the low level to the high level and maintained at the high level for a second reset time period RT2. In the present example embodiment, the reset transistor RX is turned on according to the reset control signal RS of a high level, and thus the floating diffusion node FD may be reset (reset operation).

The readout circuit 130 of FIG. 1 may receive the reset signal RST, the first image signal SIG1, and the second image signal SIG2, and may generate color pixel values and white pixel values based on the received signals.

For example, the readout circuit 130 may calculate color pixel values based on the first image signal SIG1 and the reset signal RST. For example, the readout circuit 130 may calculate color pixel values based on a difference between the first image signal SIG1 and the reset signal RST.

For example, the readout circuit 130 may calculate white pixel values based on the first image signal SIG1 and the second image signal SIG2. For example, the readout circuit 130 may calculate white pixel values based on a difference between the first image signal SIG1 and the second image signal SIG2.

As described above, according to the image sensor 100 the present example embodiment, by reading out a plurality of pixel signals including a sensing signal of a color pixel and a sensing signal of a white pixel (or a yellow pixel) from the pixel array 110 having an RGBY pattern (or an RGBY pattern) in a single frame period, a high frame rate may be maintained and power consumption may be reduced.

Figure 5A:
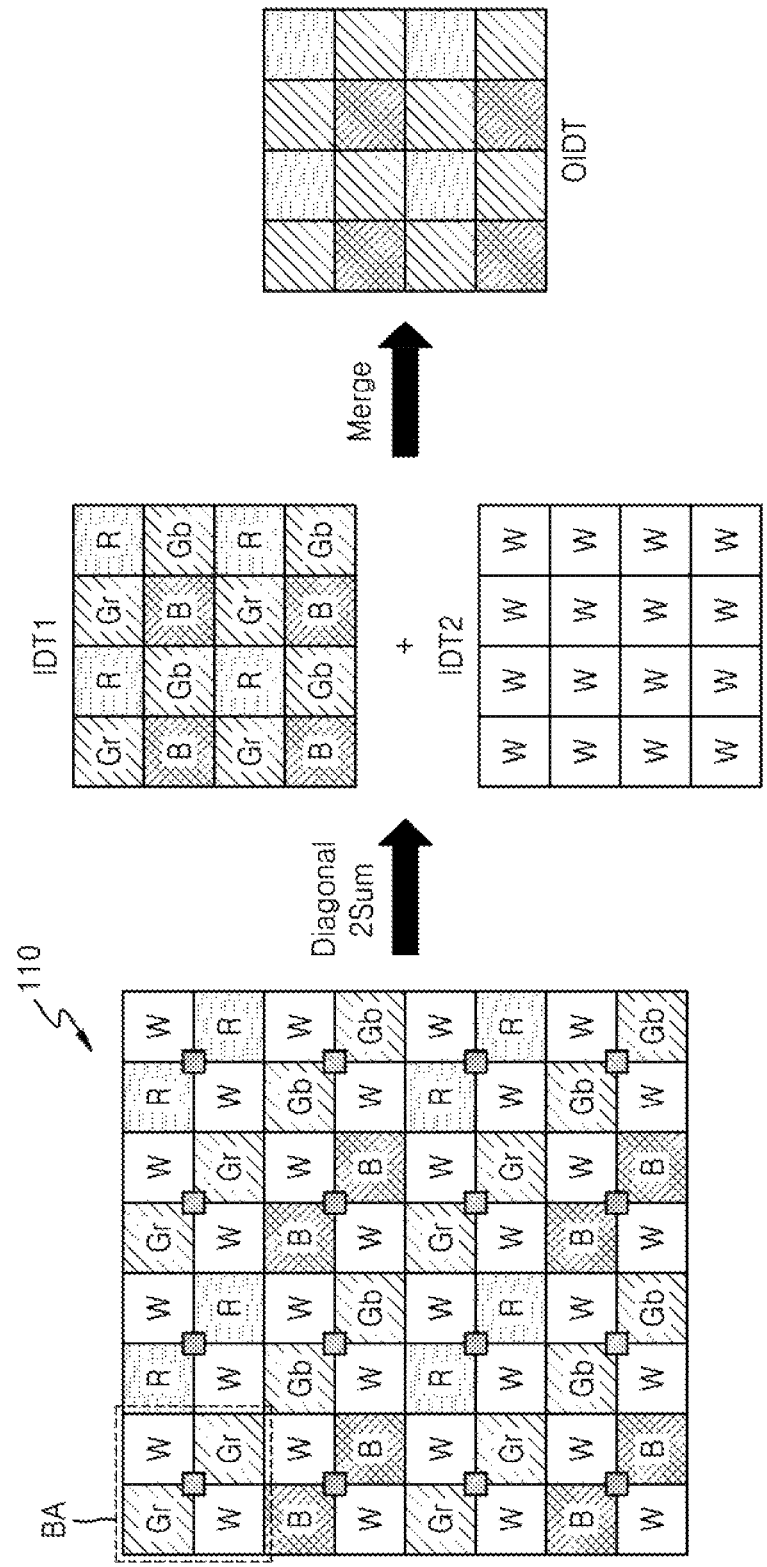
FIG. 5A is a diagram illustrating an operation of generating low-resolution image data of an image sensor including a pixel array having an RGBW pattern, according to an example embodiment.
Figure 5B:
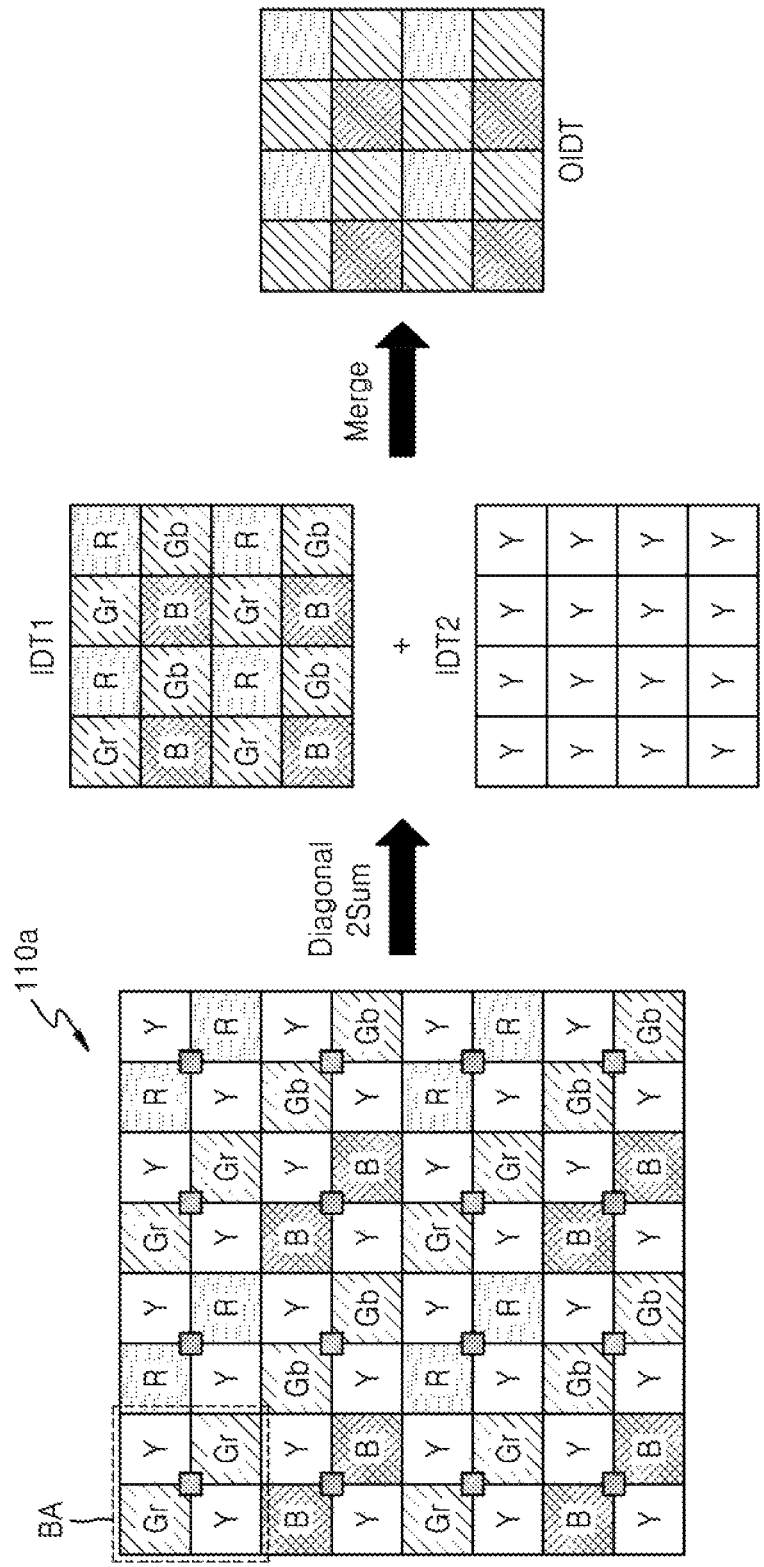
FIG. 5B is a diagram illustrating an operation of generating low-resolution image data of an image sensor including a pixel array having an RGBY pattern, according to an example embodiment.

FIG. 5A is a diagram illustrating an operation of generating low-resolution image data of an image sensor including a pixel array 110 having an RGBW pattern, according to an example embodiment. FIG. 5B is a diagram illustrating an operation of generating low-resolution image data of an image sensor including a pixel array 110a having an RGBY pattern, according to an example embodiment.

Referring to FIG. 5A, the pixel array 110 may have an RGBW pattern. The readout circuit 130 may receive, in a first mode of performing a binning operation, a plurality of pixel signals respectively corresponding to binning areas BA. The readout circuit 130 may calculate color pixel values and white pixel values of each of the binning areas BA based on the plurality of pixel signals to generate first image data IDT1 and second image data IDT2.

In the example embodiment of FIG. 5A, the pixel array 110 includes sixteen binning areas BA arranged in a 4×4 matrix, and the readout circuit 130 may calculate sixteen color pixel values respectively corresponding to the sixteen binning areas BA. The readout circuit 130 may generate first image data IDT1 based on the calculated sixteen color pixel values. The readout circuit 130 may calculate sixteen white pixel values respectively corresponding to the sixteen binning areas BA, and generate second image data IDT2 based on the calculated sixteen white pixel values.

Referring to FIG. 5B, the pixel array 110 may have an RGBY pattern. Output image data OIDT may be generated according to the above-described method of FIG. 5A.

For example, referring to FIG. 5B, the pixel array 110a includes sixteen binning areas BA arranged in a 4×4 matrix. The readout circuit 130 may calculate sixteen color pixel values respectively corresponding to the sixteen binning areas BA, and generate first image data IDT1 based on the calculated sixteen color pixel values. The readout circuit 130 may calculate sixteen yellow pixel values respectively corresponding to the sixteen binning areas BA, and generate second image data IDT2 based on the calculated sixteen yellow pixel values.

The image signal processor 160 may generate output image data OIDT by merging the first image data IDT1 with the second image data IDT2 in units of the binning areas BA, e.g., so as to output sixteen values corresponding to the sixteen color pixel values respectively merged with the sixteen yellow pixel values.

Figure 6:
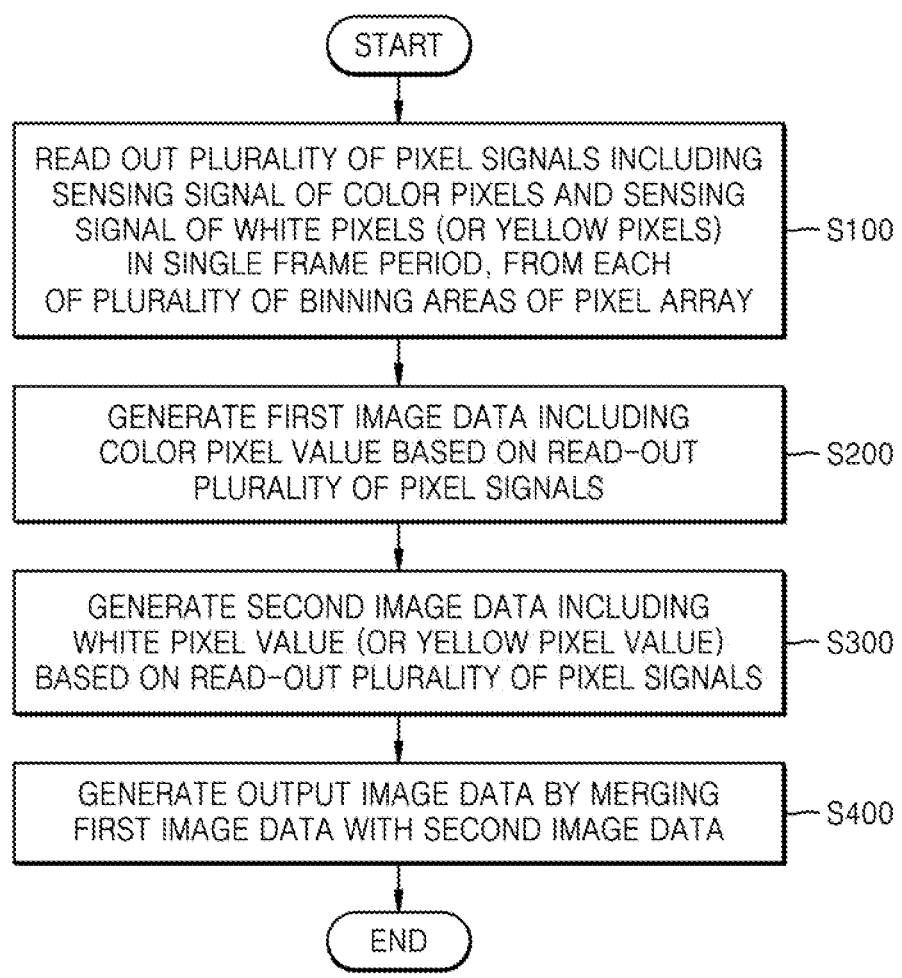
FIG. 6 is a flowchart of an operating method of an image sensor, according to an example embodiment.

FIG. 6 is a flowchart of an operating method of an image sensor, according to an example embodiment. The operating method of FIG. 6 may be applied to the image sensor 100 of FIG. 1.

Referring to FIGS. 1 and 6, the image sensor 100 may read out a plurality of pixel signals including a sensing signal of color pixels and a sensing signal of white pixels (or yellow pixels) in a single frame period from each of the plurality of binning areas BA of the pixel array 110 (S100).

For example, the image sensor 100 may read out a plurality of pixel signals in a single frame period from a binning area BA including a plurality of pixels PX that share a floating diffusion node. The plurality of pixel signals that are read out may include a reset signal, a first image signal including a sensing signal of color pixels, and a second image signal including a sensing signal of color pixels and a sensing signal of white pixels (or yellow pixels).

Then, the image sensor 100 may generate first image data IDT1 including a color pixel value based on the read-out plurality of pixel signals (S200).

For example, the image sensor 100 may generate first image data IDT1 including a color pixel value based on a reset signal and a first image signal from among the plurality of pixel signals.

Then, the image sensor 100 may generate second image data IDT2 including a white pixel value (or a yellow pixel value) based on the read-out plurality of pixel signals (S300).

For example, the image sensor 100 may generate second image data IDT2 including a white pixel value (or a yellow pixel value) based on the first image signal and the second image signal from among the plurality of pixel signals.

Then, the image sensor 100 may generate output image data OIDT by merging the first image data with the second image data (S400).

For example, the image sensor 100 may generate the output image data OIDT by merging the first image data IDT1 with the second image data IDT2 in units of binning areas BA.

FIGS. 7A through 7D are diagrams for describing a read-out method according to an example embodiment. Hereinafter, for convenience of description, it is assumed that the pixel array 110 includes four binning areas BA, i.e., first through fourth binning areas BA1, BA2, BA3, and BA4. However, more binning areas BA may be included in the pixel array 110.

Figure 7A:
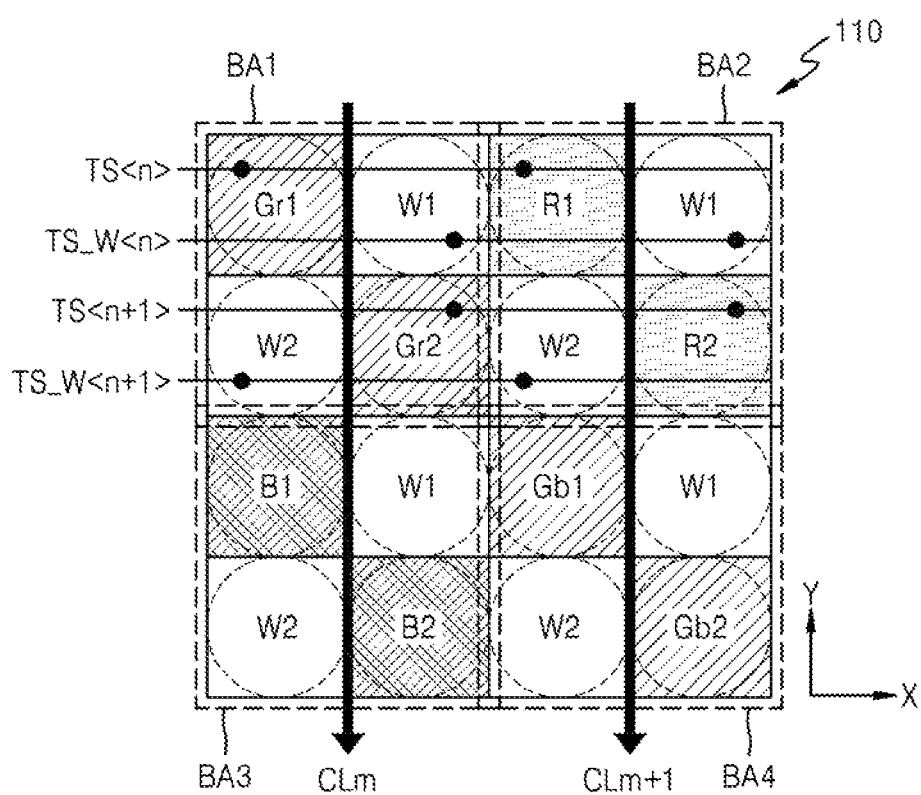
FIGS. 7A through 7D are diagrams for describing a read-out method according to an example embodiment.

The image sensor 100 may read out a plurality of pixel signals from each binning area BA in a first mode of performing a binning operation. Referring to FIGS. 7A and 7C, the image sensor 100 may read out a plurality of pixel signals from each of the first through fourth binning areas BA1, BA2, BA3, and BA4.

In an example embodiment, binning areas BA arranged in a first direction (e.g., an X-axis direction) may share transmission lines for receiving transmission control signals TS, and binning areas BA arranged in a second direction (e.g., a Y-axis direction) may share a column line for outputting pixel signals.

For example, referring to FIG. 7A, the first binning area BA1 and the second binning area BA2 arranged in the X-axis direction may share transmission control signals Ts<n>, TS_W<n>, TS<n+1>, and TS_W<n+1>. Referring to FIG. 7C, the third binning area BA3 and the fourth binning area BA4 arranged in the X-axis direction may share transmission control signals Ts<n+2>, TS_W<n+2>, TS<n+3>, and TS_W<n+3>. Referring again to FIG. 7A, the first binning area BA1 and the third binning area BA3 arranged in the Y-axis direction may share a column line CLm. Referring again to FIG. 7C, the second binning area BA2 and the fourth binning area BA4 may share a column line CLm+1.

The image sensor 100 may read out a plurality of pixel signals in units of two row lines in each frame period.

For example, referring to FIG. 7C, the image sensor 100 may read out a plurality of pixel signals from each of the first binning area BA1 and the second binning area BA2 respectively arranged in a first row (e.g., row n) and a second row (e.g., row n+1) in a first frame period T_FRAME1.

Figure 7B:
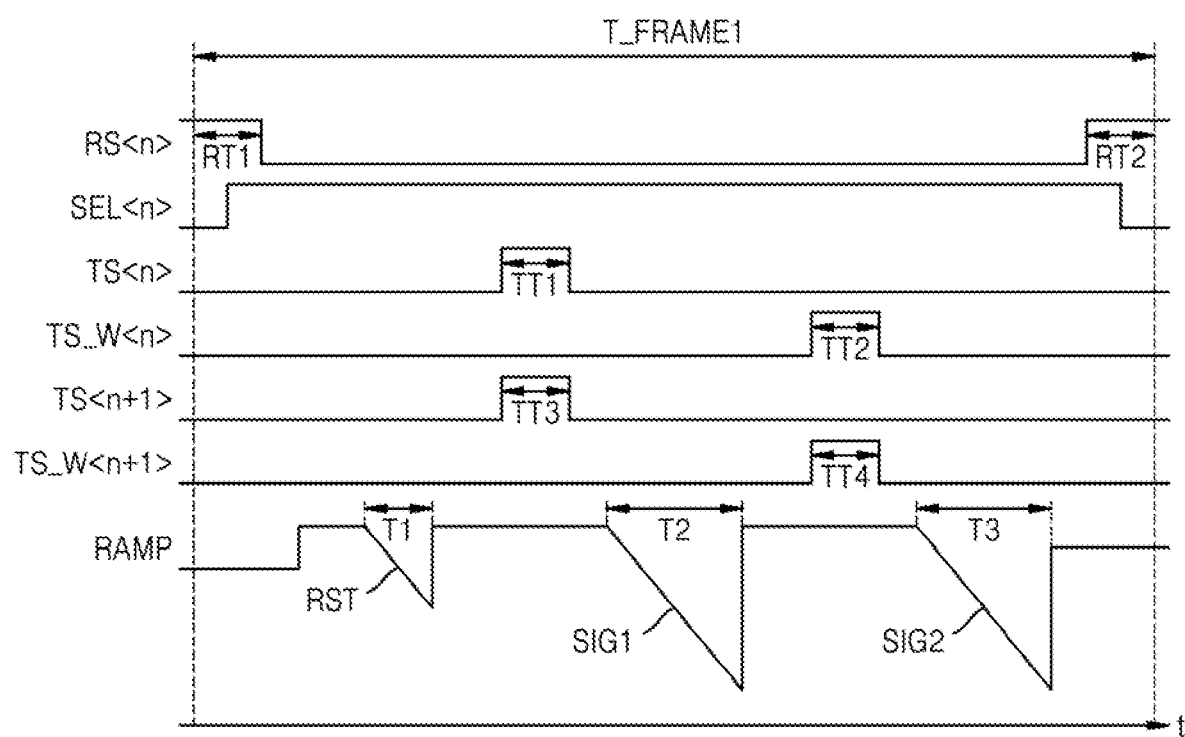
Figure 7C:
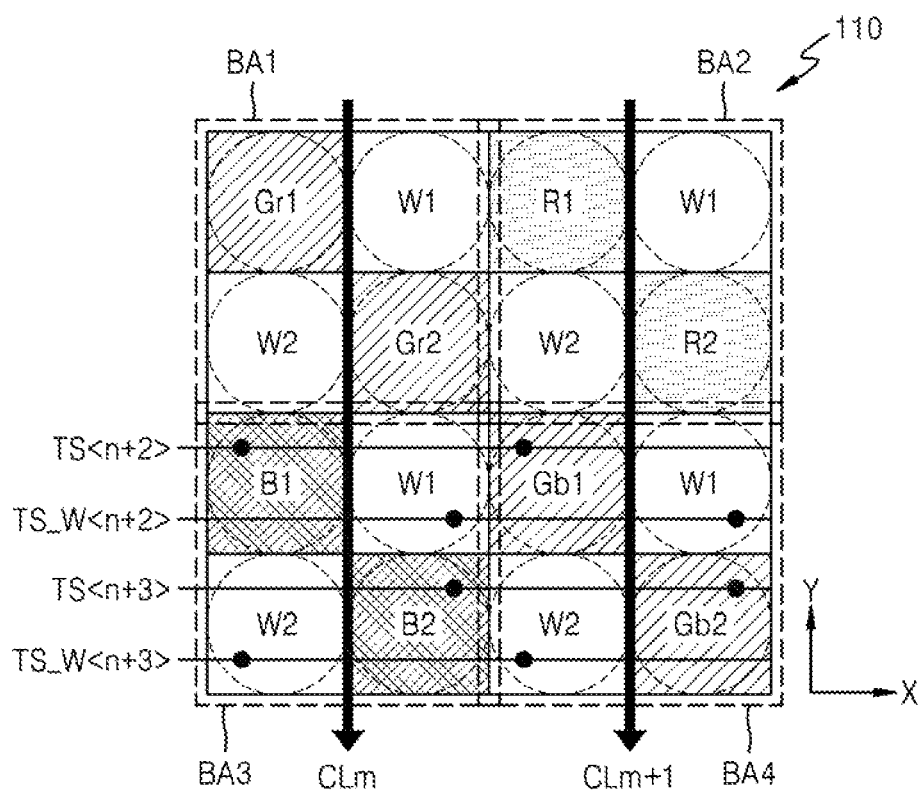
Figure 7D:
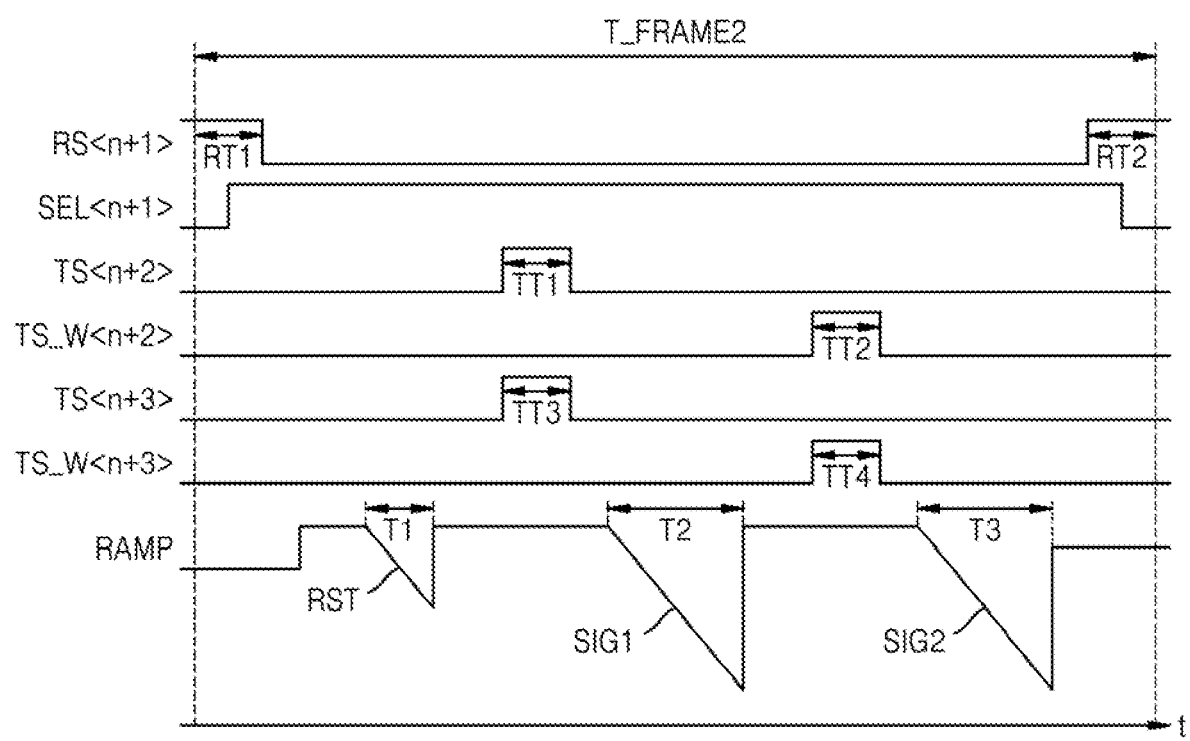

Then, referring to FIG. 7D, the image sensor 100 may read out a plurality of pixel signals from each of the third binning area BA3 and the fourth binning area BA4 respectively arranged in a third row (e.g., row n+2) and a fourth row (e.g., row n+3) in a second frame period T_FRAME2 after the first frame period T_FRAME1.

Hereinafter, an operation in the first frame period T_FRAME1 will be described in further detail with reference to FIGS. 7A and 7B, and an operation in the second frame period T_FRAME2 will be described in further detail with reference to FIGS. 7C and 7D.

Referring to FIG. 7A, the first binning area BA1 and the second binning area BA2 may share row lines and receive control signals from the row driver 120 of FIG. 1 through the row lines, as described above. For example, the first binning area BA1 and the second binning area BA2 may receive, through four row lines, an $n^{th}$ color pixel transmission control signal TS<n>, an $n^{th}$ white pixel transmission control signal TS_W<n>, an $n+1^{th}$ color pixel transmission control signal TS<n+1>, and an $n+1^{th}$ white pixel transmission control signal TS_W<n+1>.

In response to the $n^{th}$ color pixel transmission control signal TS<n>, first color pixels, i.e., a first green pixel Gr1 and a red pixel R1, of the first binning area BA1 and the second binning area BA2 may transmit charges accumulated in photoelectric conversion devices to a floating diffusion node. In response to the $n^{th}$ white pixel transmission control signal TS_W<n>, first white pixels W1 of the first binning area BA1 and the second binning area BA2 may transmit charges accumulated in the photoelectric conversion devices to the floating diffusion node.

In response to the $n+1^{th}$ color pixel transmission control signal TS<n+1>, second color pixels, i.e., a first green pixel Gr2 and a red pixel R2, of the first binning area BA1 and the second binning area BA2 may transmit charges accumulated in the photoelectric conversion devices to the floating diffusion node. In response to the $n+1^{th}$ white pixel transmission control signal TS_W<n+1>, second white pixels W2 of the first binning area BA1 and the second binning area BA2 may transmit charges accumulated in the photoelectric conversion devices to the floating diffusion node.

Referring to FIG. 7B, in the first frame period T_FRAME1, each of the first binning area BA1 and the second binning area BA2 may output a plurality of pixel signals in response to the above-described transmission control signals, i.e., the $n^{th}$ color pixel transmission control signal TS<n>, the $n^{th}$ white pixel transmission control signal TS_W<n>, the $n+1^{th}$ color pixel transmission control signal TS<n+1>, and the $n+1^{th}$ white pixel transmission control signal TS_W<n+1>, an $n^{th}$ reset signal RS<n>, and an $n^{th}$ selection signal SEL<n>.

Comparing the embodiment of FIG. 4 to the embodiment of FIG. 7B, the first transmission control signal TS1 may correspond to the $n^{th}$ color pixel transmission control signal TS<n>, and the second transmission control signal TS2 may correspond to the $n^{th}$ white pixel transmission control signal TS_W<n>, the third transmission control signal TS3 may correspond to the $n+1^{th}$ color pixel transmission control signal TS<n+1>, and the fourth transmission control signal TS4 may correspond to the $n+1^{th}$ white pixel transmission control signal TS_W<n+1>, the reset control signal RS may correspond to the $n^{th}$ reset signal RS<n>, and the selection signal SEL may correspond to the $n^{th}$ selection signal SEL<n>. A method of outputting the reset signal RST, the first image signal SIG1, and the second image signal SIG2 of each of the first binning area BA1 and the second binning area BA2 according to level shift of each of the transmission control signals TS<n>, TS_W<n>, TS<n+1>, TS_W<n+1>, the $n^{th}$ reset signal RS<n>, and the $n^{th}$ selection signal SEL<n> may be applied in the same manner as in the example described above with respect to FIG. 4, and thus, repeated description thereof will be omitted.

The first binning area BA1 may output the reset signal RST, the first image signal SIG1 corresponding to pixel signals of the first green pixels Gr1 and Gr2, and the second image signal SIG2 corresponding to pixel signals of the first green pixels Gr1 and Gr2 and the white pixels W1 and W2. The second binning area BA2 may output the reset signal RST, the first image signal SIG1 corresponding to pixel signals of the red pixels R1 and R2, and the second image signal SIG2 corresponding to pixel signals of the red pixels R1 and R2 and the white pixels W1 and W2.

Referring to FIG. 7C, the third binning area BA3 and the fourth binning area BA4 may share row lines, and receive control signals from the row driver 120 of FIG. 1 through transmission lines.

For example, the third binning area BA3 and the fourth binning area BA4 may receive, via four transmission lines, an $n+2^{th}$ color pixel transmission control signal TS<n+2>, an $n+2^{th}$ white pixel transmission control signal TS_W<n+2, an $n+3^{th}$ color pixel transmission control signal TS<n+3>, and an $n+3^{th}$ white pixel transmission control signal TS_W<n+3>.

First color pixels, i.e., a blue pixel B1 and a second green pixel Gb1, of the third binning area BA3 and the fourth binning area BA4 may transmit charges accumulated in the photoelectric conversion devices in response to the $n+2^{th}$ color pixel transmission control signal TS<n+2>. First white pixels W1 of the third binning area BA3 and the fourth binning area BA4 may transmit charges accumulated in the photoelectric conversion devices in response to the $n+2^{th}$ white pixel transmission control signal TS_W<n+2>.

Second color pixels, i.e., a blue pixel B2 and a second green pixel Gb2, of the third binning area BA3 and the fourth binning area BA4 may transmit charges accumulated in the photoelectric conversion devices in response to the $n+3^{th}$ color pixel transmission control signal TS<n+3>. Second white pixels W2 of the third binning area BA3 and the fourth binning area BA4 may transmit charges accumulated in the photoelectric conversion devices in response to the $n+3^{th}$ white pixel transmission control signal TS_W<n+3>.

Referring to FIG. 7D, in the second frame period T_FRAME2, each of the third binning area BA3 and the fourth binning area BA4 may output a plurality of pixel signals in response to the above-described transmission control signals, i.e., n+2$^{th}$ color pixel transmission control signal TS<n+2>, the n+2$^{th}$ white pixel transmission control signal TS_W<n+2>, the n+3$^{th}$ color pixel transmission control signal TS<n+3>, the n+3$^{th}$ white pixel transmission control signal TS_W<n+3>, an n+1$^{th}$ reset signal RS<n+1>, and an n+1$^{th}$ selection signal SEL<n+1>.

Comparing the embodiment of FIG. 4 to the embodiment of FIG. 7D, the first transmission control signal TS1 may correspond to the n+2$^{th}$ color pixel transmission control signal TS<n+2>, and the second transmission control signal TS2 may correspond to the n+2$^{th}$ white pixel transmission control signal TS_W<n+2>, the third transmission control signal TS3 may correspond to the n+3$^{th}$ color pixel transmission control signal TS<n+3>, and the fourth transmission control signal TS4 may correspond to the n+3$^{th}$ white pixel transmission control signal TS_W<n+3>, the reset control signal RS may correspond to the n+1$^{th}$ reset signal RS<n+1>, and the selection signal SEL may correspond to the n+1$^{th}$ selection signal SEL<n+1>. A method of outputting the reset signal RST, the first image signal SIG1, and the second image signal SIG2 of each of the third binning area BA3 and the fourth binning area BA4 according to level transition of each of the transmission control signals TS<n+2>, TS W<n+2>, TS<n+3>, TS W<n+3>, the n+1$^{th}$ reset signal RS<n+1>, and the n+1$^{th}$ selection signal SEL<n+1> may be applied in the same manner as in the example described above with respect to FIG. 4, and thus, repeated description thereof will be omitted.

The third binning area BA3 may output the reset signal RST, the first image signal SIG1 corresponding to pixel values of the blue pixels B1 and B2, and the second image signal SIG2 corresponding to pixel values of the blue pixels B1 and B2 and the white pixels W1 and W2. The fourth binning area BA4 may output the reset signal RST, the first image signal SIG1 corresponding to pixel values of the second green pixels Gb1 and Gb2, and the second image signal SIG2 corresponding to pixel values of the second green pixels Gb1 and Gb2 and the white pixels W1 and W2.

Figure 8:
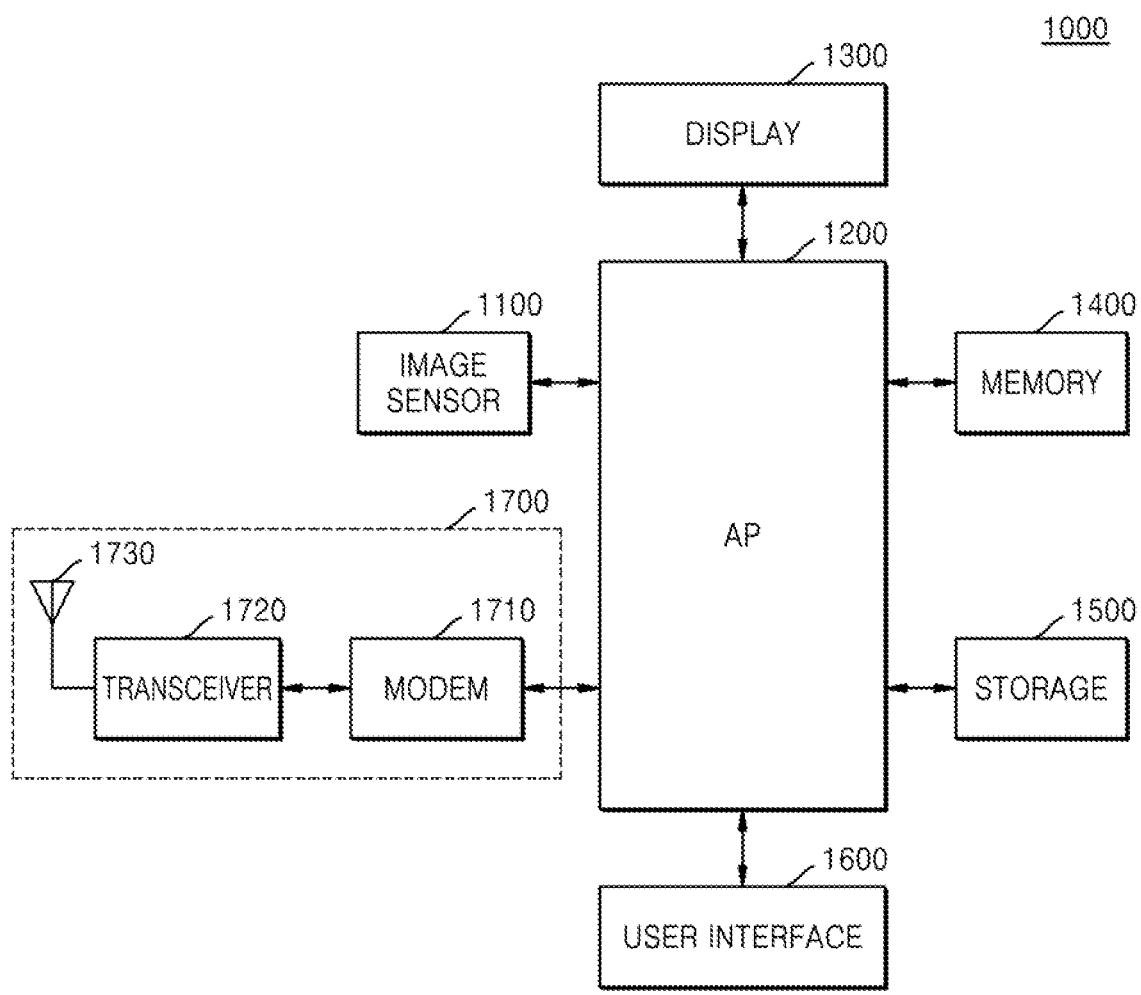
FIG. 8 is a block diagram illustrating an electronic device according to an example embodiment.

FIG. 8 is a block diagram illustrating an electronic device according to an example embodiment.

Referring to FIG. 8, an electronic device 1000 may include an image sensor 1100, an application processor 1200, a display 1300, a memory 1400, a storage 1500, a user interface 1600, and a radio transceiver 1700.

The image sensor 1100 of FIG. 8 may correspond to the image sensor of FIG. 1. Description of details provided above with reference to FIG. 1 will be omitted here.

The application processor 1200 may control the overall operation of the electronic device 1000 and may be provided as a system on chip (SoC) driving an application program, an operating system, or the like. The application processor 1200 may receive image data from the image sensor 1100, and may perform image processing on the received image data. In an example embodiment, the application processor 1200 may store the received image data and/or processed image data in the memory 1400 or the storage 1500.

The display 1300 may display images, information, etc. provided by the application processor 1200.

The memory 1400 may store programs and/or data processed or executed by the application processor 1200.

The storage 1500 may be implemented using a nonvolatile memory device such as a NAND flash, a resistive memory, or the like, and the storage 1500 may be provided using, e.g., a memory card (a multi-media card (MMC), an embedded MMC (eMMC), a secure digital (SD) card, a micro SD). The storage 1500 may store data and/or programs on an execution algorithm for controlling an image processing operation of the application processor 1200, and when an image processing operation is performed, the data and/or program may be loaded to the memory 1400.

The user interface 1600 may be implemented using various devices via which a user input may be received, such as a keyboard, a curtain key panel, a touch panel, a fingerprint sensor, a microphone. The user interface 1600 may receive a user input and provide a signal corresponding to the received user input to the application processor 1200.

The radio transceiver 1700 may include a modem 1710, a transceiver 1720, and an antenna 1730.

Figure 9:
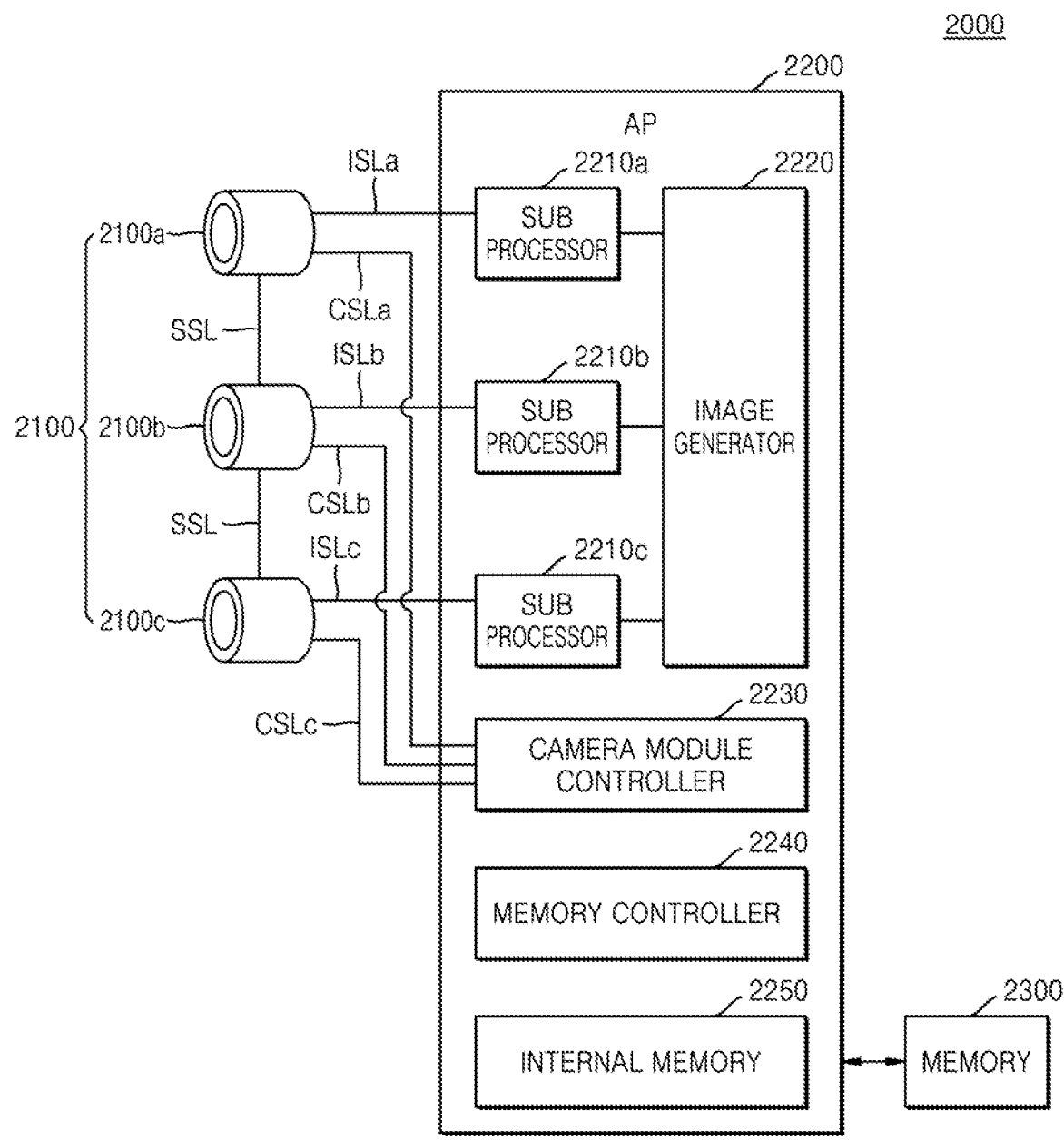
FIG. 9 is a block diagram illustrating a portion of an electronic device according to an example embodiment.
Figure 10:
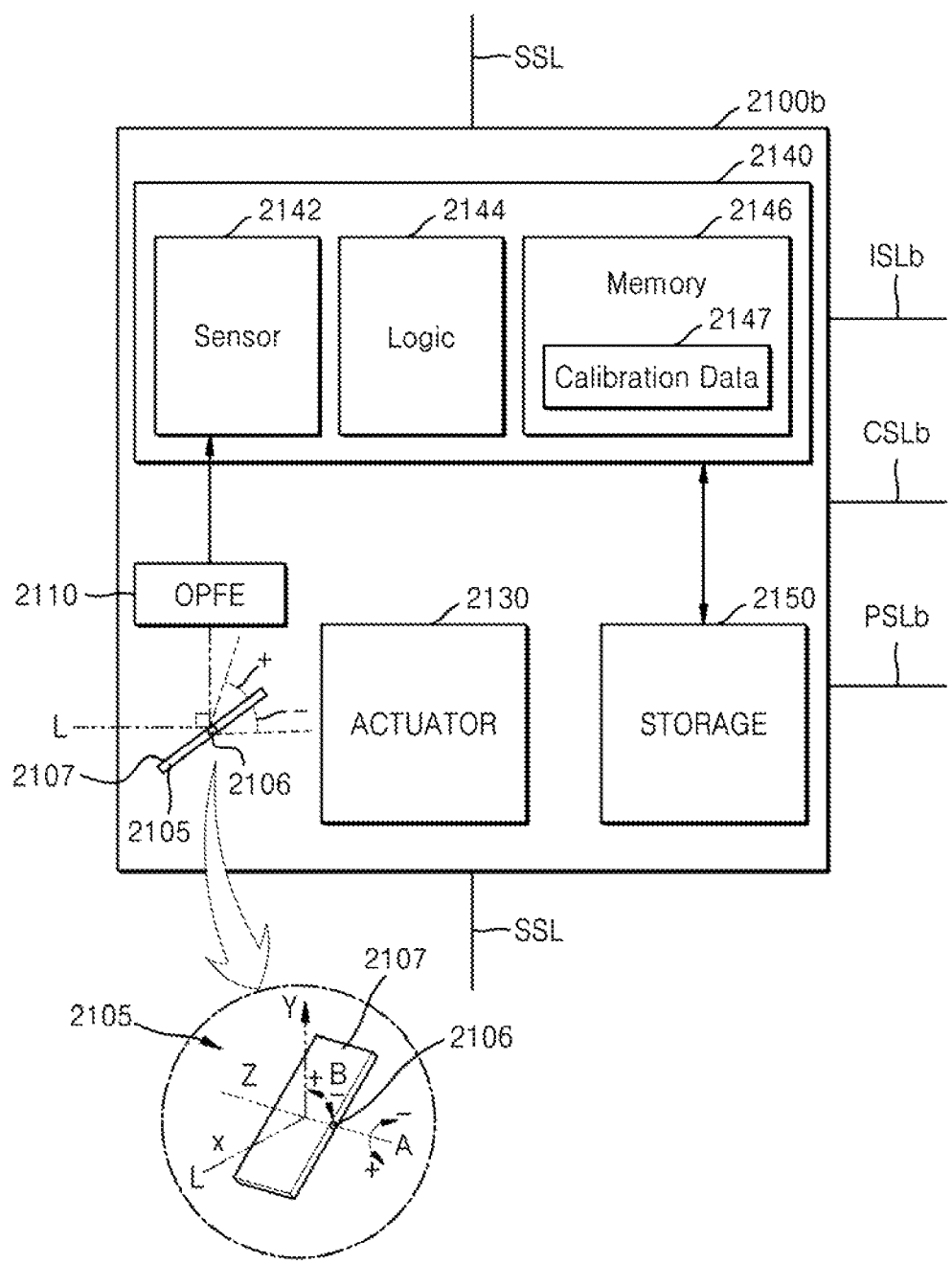
FIG. 10 is a detailed structural block diagram of a camera module according to an example embodiment.

FIG. 9 is a block diagram illustrating a portion of an electronic device according to an example embodiment. FIG. 10 is a detailed structural block diagram of a camera module according to an example embodiment. For example, FIG. 9 illustrates an electronic device 2000 as a portion of the electronic device 1000 of FIG. 8, and FIG. 10 illustrates a detailed structure of a second camera module 2100b of FIG. 9.

Referring to FIG. 9, the electronic device 2000 may include a multi-camera module 2100, an application processor (AP) 2200, and a memory 2300.

The electronic device 2000 may capture and/or store an image of an object by using a CMOS image sensor, and may be implemented as a mobile phone, a tablet computer, or a portable electronic device. The portable electronic device may include a laptop computer, a mobile phone, a smartphone, a tablet PC, a wearable device, etc.

The multi-camera module 2100 may include a first camera module 2100a, the second camera module 2100b, and a third camera module 2100c. The multi-camera module 2100 may include the image sensor 100 of FIG. 1. Although the multi-camera module 2100 illustrated in FIG. 9 includes the three camera modules, i.e., the first camera module, the second camera module 2100b, and the third camera module 2100c, various numbers of camera modules may be included in the multi-camera module 2100.

The AP 2200 is described in further detail below, in connection with FIG. 10.

The memory 2300 may have a same function as the memory 1400 illustrated in FIG. 8, and repeated description thereof will be omitted.

Hereinafter, referring to FIG. 10, a detailed structure of the second camera module 2100b will be described in detail. The description below may also apply to the other camera modules, the first camera module 2100a, and the third camera module 2100c.

Referring to FIG. 10, the second camera module 2100b may include a prism 2105, an optical path folding element (OPFE) 2110, an actuator 2130, an image sensing device 2140, and a storage 2150.

The prism 2105 may include a reflective surface 2107 of a light reflecting material to deform a path of light L incident from the outside. According to an example embodiment, the prism 2105 may change the path of light L incident in the first direction X to the second direction Y perpendicular to the first direction X. The prism 2105 may rotate the reflective surface 2107 of the light reflecting material in an A direction or a B direction around a center axis 2106, thereby changing the path of the light L incident in the first direction X to the second direction Y perpendicular to the first direction X. The OPFE 2110 may also move in a third direction Z perpendicular to the first direction X and second direction Y.

In the example embodiment, the maximum rotatable angle of the prism 2105 in the direction A may be less than or equal to 15 degrees in the positive (+) A direction and may be greater than 15 degrees in the negative (−) A direction.

The prism 2105 may move the reflective surface 2107 of the light reflecting material in the third direction (e.g., a Z direction) parallel to the direction in which the center axis 2106 extends. In an example embodiment, the prism 2105 may move the reflective surface 2107 of the light reflecting material in the third direction (e.g., a Z direction) parallel to the direction in which the center axis 2106 extends.

The OPFE 2110 may include optical lenses including m (where m is a natural number) groups, and the m lenses may move in the second direction Y and change the optical zoom ratio of the camera module 2100b. For example, when the basic optical zoom ratio of the camera module 2100b is Z and the m optical lenses included in the OPFE 2110 are moved, the optical zoom ratio of the camera module 2100b may be changed to 3Z, 5Z, or an optical zoom ratio higher than 5Z.

The actuator 2130 may move the OPFE 2110 or optical lenses (hereinafter referred to as an optical lens) to a particular position. For example, the actuator 2130 may adjust the position of the optical lens, such that the image sensor 2142 is positioned at the focal length of the optical lens for accurate sensing.

The image sensing device 2140 may include an image sensor 2142, a control logic 2144, and a memory 2146.

The image sensor 2142 may sense an image of a sensing target by using the light L provided through the optical lens. The image sensor 2142 of FIG. 10 may be similar to the image sensor 100 of FIG. 1 functionally, and thus repeated description thereof will be omitted.

The control logic 2144 may control the overall operation of the second camera module 2100b. For example, the control logic 2144 may control an operation of the second camera module 2100b according to a control signal provided via a control signal line CSLb.

The memory 2146 may store information necessary for the operation of the second camera module 2100b, e.g., calibration data 2147. The calibration data 2147 may include information necessary for the second camera module 2100b to generate image data by using the light L provided from the outside. The calibration data 2147 may include, e.g., information about a degree of rotation described above, information about a focal length, information about an optical axis, etc. When the second camera module 2100b is implemented in the form of a multi-state camera in which the focal length is changed depending on the position of the optical lens, the calibration data 2147 may include focal distance values for respective positions (or states) of the optical lens and information related to auto focusing.

The storage 2150 may store image data sensed through the image sensor 2142. The storage 2150 may be provided outside the image sensing device 2140 and may be stacked with a sensor chip constituting the image sensing device 2140. The storage 2150 may be implemented with an electrically erasable programmable read-only memory (EE-PROM), for example.

Referring to FIGS. 9 and 10 together, in an example embodiment, one camera module (e.g., the first camera module 2100a) from among the first through third camera modules 2100a, 2100b, and 2100c may include four sub-pixels that are adjacent to one another and share the same color information in one color pixel (i.e., tetra cell), and another camera module (e.g., the second camera module 2100b) may include nine sub-pixels that are adjacent to one another and share the same color information in one color pixel (i.e., a nona cell).

The first through third camera modules 2100a, 2100b, and 2100c may each include an actuator 2130. Therefore, the first through third camera modules 2100a, 2100b, and 2100c may include the same or different calibration data 2147 according to the operation of actuators 2130 included therein.

In an example embodiment, one camera module (e.g., the second camera module 2100b) from among the first through third camera modules 2100a, 2100b, and 2100c may be a folded lens-type camera module including the prism 2105 and the OPFE 2110 as described above, and the other camera modules (e.g., 2100a and 2100c) may be a vertical-type camera module without the prism 2105 and the OPFE 2110.

One camera module (e.g., the third camera module 2100c) from among the first through third camera modules 2100a, 2100b, and 2100c may be a vertical type depth camera that extracts depth information by using an infrared ray (IR), for example. In this case, the AP 2200 may generate a 3D depth image by merging image data provided from such a depth camera with image data provided from another camera module (e.g., the first camera module 2100a or the second camera module 2100b).

At least two camera modules (e.g., the first camera module 2100a and the second camera module 2100b) from among the first through third camera modules 2100a, 2100b, and 2100c may have different field of views (FOVs). In this case, e.g., at least two camera modules (e.g., the first camera module 2100a and the second camera module 2100b) from among the first through third camera modules 2100a, 2100b, and 2100c may have different optical lenses. For example, the first camera module 2100a from among the first through third camera modules 2100a, 2100b, and 2100c may have a smaller FOV than the second camera module 2100b and the third camera module 2100c. The multi-camera module 2100 may further include a camera module having a larger FOV than originally used camera modules 2100a, 2100b, and 2100c. The first through third camera modules 2100a, 2100b, and 2100c may have different FOVs from one another. In this case, optical lenses included in the first through third camera modules 2100a, 2100b, and 2100c may also be different from one another.

In an example embodiment, the first through third camera modules 2100a, 2100b, and 2100c may be physically separated from one another. Thus, the first through third camera modules 2100a, 2100b, and 2100c are not divided and use the sensing area of one image sensor 2142. Rather, an independent image sensor 2142 may be provided inside each of the first through third camera modules 2100a, 2100b, and 2100c.

The AP 2200 may include a plurality of first through third sub-processors 2210a, 2210b, and 2210c, a camera module controller 2230, a memory controller 2400, and an internal memory 2500. The AP 2200 may be implemented separately from the first through third camera modules 2100a, 2100b, and 2100c. For example, the AP 2200 and the first through third camera modules 2100a, 2100b, and 2100c may be implemented separately from each other as separate semiconductor chips. Image data generated by the first through third camera modules 2100a, 2100b, and 2100c may be respectively provided to corresponding sub-processors 2210a, 2210b, and 2210c through image signal lines ISLa, ISLb, and ISLc separated from one another. For example, image data generated from the first camera module 2100a may be provided to the first sub-processor 2210a through a first image signal line ISLa, image data generated from the second camera module 2100b may be provided to the second sub-processor 2210b through a second image signal line ISLb, and image data generated from the third camera module 2100c may be provided to the third sub-processor 2210c through a third image signal line ISLc. The transmission of image data may be performed by using a camera serial interface based on the mobile industry processor interface (MIPI) standard, for example.

One sub-processor may be provided to correspond to a plurality of camera modules. For example, the first sub-processor 2210a and the third sub-processor 2210c may be integrally implemented as a single sub-processor instead of being implemented separate from each other, and image data provided from the first camera module 2100a and the third camera module 2100c may be selected by a selecting element (e.g., a multiplexer) and provided to an integrated sub-image processor.

The camera module controller 2230 may provide a control signal to each of the first through third camera module 2100a, 2100b, and 2100c. A control signal generated from the camera module controller 2230 may be provided to corresponding camera modules 2100a, 2100b, and 2100c through control signal lines CSLa, CSLb, and CSLc separated from one another.

The memory controller 2400 may control the internal memory 2500.

By way of summation and review, increased size of image data may make it difficult to maintain a high frame rate and may increase power consumption. Thus, an operating mode in which image data having a reduced size is generated via a binning operation may be used.

As described above, embodiments relate to an image sensor having a pixel array of an RGBW pattern or an RGBY pattern, and an operating method of the image sensor. Embodiments may provide an image sensor for reading out a plurality of pixel signals including a sensing signal of a color pixel and a sensing signal of a white pixel (or yellow pixel) in a single frame period, and an operating method of the image sensor.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An image sensor, comprising:
    a pixel array including a plurality of pixels divided into a plurality of binning areas, the plurality of pixels including red pixels, blue pixels, first green pixels, second green pixels, and pixels selected from white or yellow pixels;
    a readout circuit configured to, from each of the plurality of binning areas, receive a plurality of pixel signals including a first sensing signal of first pixels and a second sensing signal of second pixels during a single frame period, and output a first pixel value corresponding to the first pixels and a second pixel value corresponding to the second pixels based on the plurality of pixel signals; and
    an image signal processor configured to generate first image data based on a plurality of first pixel values corresponding to the plurality of binning areas, generate second image data based on a plurality of second pixel values corresponding to the plurality of binning areas, and generate output image data by merging the first image data with the second image data, wherein:
    the first pixels include the red pixels, the blue pixels, the first green pixels, or the second green pixels, and
    the second pixels include the white or yellow pixels.

2. The image sensor as claimed in claim 1, wherein each of the plurality of binning areas includes the first pixels and the second pixels sharing a floating diffusion node.

3. The image sensor as claimed in claim 2, wherein each of the plurality of binning areas includes two first pixels and two second pixels arranged in a 2×2 matrix.

4. The image sensor as claimed in claim 1, wherein the pixel array has a pattern in which:
    a first binning area includes the red pixels and the white pixels;
    a second binning area includes the blue pixels and the white pixels;
    a third binning area includes the first green pixels and the white pixels; and
    a fourth binning area includes the second green pixels and the white pixels, and
    the first, second, third, and fourth binning areas are repeatedly arranged.

5. The image sensor as claimed in claim 1, wherein the pixel array has a pattern in which:
    a fifth binning area includes the red pixels and the yellow pixels;
    a sixth binning area includes the blue pixels and the yellow pixels;
    a seventh binning area includes the first green pixels and the yellow pixels; and
    an eighth binning area includes the second green pixels and the yellow pixels, and
    the fifth, sixth, seventh, and eighth binning areas are repeatedly arranged.

6. The image sensor as claimed in claim 1, wherein the plurality of pixel signals include:
    a reset signal;
    a first image signal including the first sensing signal; and
    a second image signal including the first sensing signal and the second sensing signal.

7. The image sensor as claimed in claim 6, wherein:
    the readout circuit calculates the first pixel value corresponding to the first pixels based on the first image signal and the reset signal, and
    the readout circuit calculates the second pixel value corresponding to the second pixels based on the first image signal and the second image signal.

8. The image sensor as claimed in claim 1, wherein the image signal processor is further configured to generate the output image data by merging the first image data with the second image data in units of binning areas.

9. An image sensor, comprising:
    a pixel array in which a plurality of pixel groups are arranged, each of the pixel groups including color pixels and white pixels sharing a floating diffusion node;
    a readout circuit configured to receive, from each of the plurality of pixel groups, during a single frame period, a reset signal, a first image signal including a sensing signal of the color pixels, and a second image signal including sensing signals of the color pixels and the white pixels, and output color pixel values corresponding to the color pixels and white pixel values corresponding to the white pixels based on the received reset signal, first image signal, and second image signal; and an image signal processor configured to generate output image data based on the color pixel values and the white pixel values.

10. The image sensor as claimed in claim 9, wherein each of the plurality of pixel groups includes two color pixels and two white pixels.

11. The image sensor as claimed in claim 10, wherein each of the plurality of pixel groups includes:
two red pixels and two white pixels, or
two blue pixels and two white pixels, or
two first green pixels and two white pixels, or
two second green pixels and two white pixels.

12. The image sensor as claimed in claim 10, wherein each of the plurality of pixel groups includes:
a first photodiode and a second photodiode corresponding to the two color pixels;
a third photodiode and a fourth photodiode corresponding to the two white pixels;
first through fourth transmission transistors respectively corresponding to the first through fourth photodiodes, and configured to move charges accumulated in each of the first through fourth photodiodes to the floating diffusion node; and
a reset transistor configured to apply a reset voltage to the floating diffusion node.

13. The image sensor as claimed in claim 12, wherein, in each of the plurality of pixel groups, the reset transistor is configured to be turned on in response to the reset signal and charges corresponding to the reset voltage are accumulated in the floating diffusion node, and to output the reset signal corresponding to a voltage of the reset floating diffusion node.

14. The image sensor as claimed in claim 13, wherein, in each of the plurality of pixel groups,
after the reset signal is output, the first transmission transistor and the second transmission transistor are configured to be turned on in response to a first transmission control signal and a second transmission control signal so as to accumulate, in the floating diffusion node, photocharges generated by the first photodiode and the second photodiode; and
then, the first image signal corresponding to a voltage of the floating diffusion node, in which the photocharges are accumulated, is output.

15. The image sensor as claimed in claim 14, wherein, in each of the plurality of pixel groups,
after the first image signal is output, the first through fourth transmission transistors are configured to be turned on in response to first through fourth transmission control signals so as to accumulate, in the floating diffusion node, photocharges generated by the first through fourth photodiodes; and
then, the second image signal corresponding to a voltage of the floating diffusion node, in which the photocharges are accumulated, is output.

16. The image sensor as claimed in claim 9, wherein the image signal processor is further configured to generate first image data based on a plurality of color pixel values corresponding to the plurality of pixel groups, generate second image data based on a plurality of white pixel values corresponding to the plurality of pixel groups, and generate the output image data by merging the first image data with the second image data in units of pixel groups.

17. An operating method of an image sensor, the operating method comprising:
reading out, from each of a plurality of binning areas of a pixel array, a plurality of pixel signals including a sensing signal of color pixels and a sensing signal of white pixels in a single frame period;
generating first image data including color pixel values based on the plurality of pixel signals;
generating second image data including white pixel values based on the plurality of pixel signals; and
generating output image data by merging the first image data with the second image data.

18. The operating method as claimed in claim 17, wherein the reading out of the plurality of pixel signals includes reading out a reset signal, a first image signal including the sensing signal of the color pixels, and a second image signal including the sensing signal of the color pixels and the sensing signal of the white pixels.

19. The operating method as claimed in claim 18, wherein the generating of the first image data includes generating the first image data based on a difference between the reset signal and the first image signal.

20. The operating method as claimed in claim 19, wherein the generating of the second image data includes generating the second image data based on a difference between the first image signal and the second image signal.

* * * * *